May 16, 1950     C. D. BRANSON     2,507,621
FLUID MIXING DEVICE
Filed Aug. 7, 1947
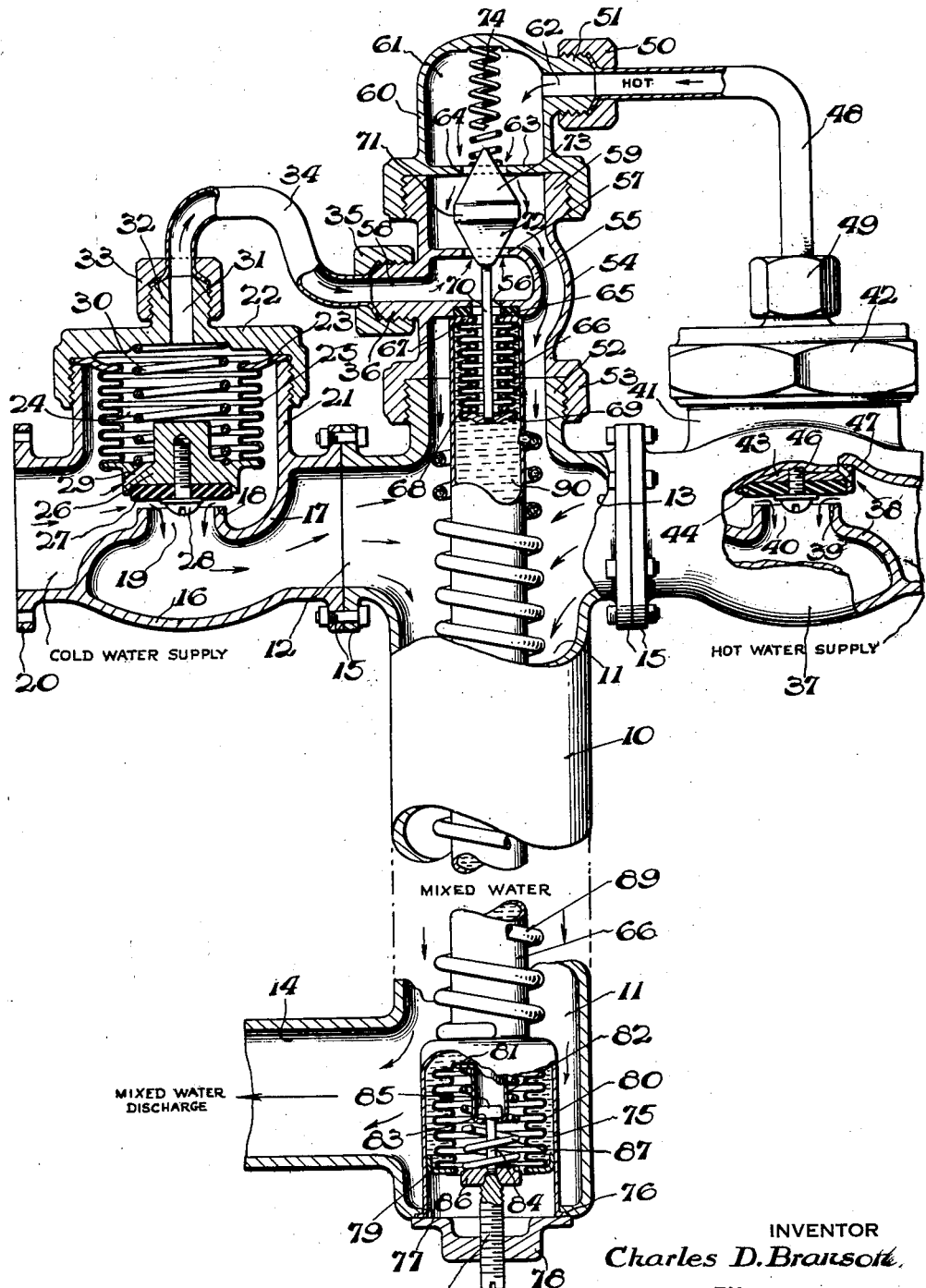
INVENTOR
Charles D. Branson,
BY
Cameron, Kerkam + Sutton
ATTORNEYS Patented May 16, 1950

2,507,621

UNITED STATES PATENT OFFICE 2,507,621

FLUID MIXING DEVICE

Charles D. Branson, Knoxville, Tenn., assignor to Robertshaw-Fulton Controls Company, a corporation of Delaware Application August 7, 1947, Serial No. 767,216

3 Claims. (Cl. 236—12)

This invention relates to fluid mixing devices and more particularly to fluid mixing devices under thermostatic control, preferably of the preset type. While the invention may be applied to the mixing of a wide variety of fluids, it will be exemplified by reference to its use in a hot and cold water mixer.

Fluid mixers as heretofore provided have frequently been open to the objection that the valve or valves under thermostatic control have a tendency to overrun their proper positions or "hunt" so as to produce an undesirable variation and instability in the temperature of the mixture. Again, variations in the pressure of the fluids under control have frequently affected the operation of the mixer adversely, even to the point of at times holding one or both of the valves in open or closed position instead of properly positioning them to proration the fluids suitably for a mixture of the desired temperature.

It is an object of this invention to provide an improved fluid mixing device wherein hunting of the valves is substantially if not entirely eliminated.

Another object of this invention is to provide an improved fluid mixing device wherein variations in the pressure of the fluids under control do not adversely affect the operation of the device.

Another object of this invention is to provide an improved fluid mixing device wherein adjustments of the flow of the fluids to be controlled are effected smoothly so as to avoid abrupt changes in the temperature of the mixture.

Another object of this invention is to provide an improved fluid mixing device wherein the valves controlling the flow of the fluids are under the regulation of a highly sensitive pilot valve that in turn is sensitively responsive to variations in the temperature of the mixture.

Another object of this invention is to provide an improved fluid mixing device wherein the valves for controlling the flow of the respective fluids are operated by the pressure of the fluids themselves but under the control of a sensitive thermostatically operated pilot valve.

Another object of this invention is to provide an improved fluid mixing device which is equally capable of efficiently controlling the temperature of large volumes of water, for example several hundred gallons per hour, or of smaller volumes down to and including volumes of a fraction of a gallon per hour.

Another object of this invention is to provide a fluid mixing device having improved temperature responsive means for predetermining the temperature of the mixture.

Another object of this invention is to provide a fluid mixing device having improved means for pre-setting the temperature to be maintained.

Another object of this invention is to provide an improved fluid mixing device which is accurately and sensitively responsive to variations in the temperature of the mixture and smoothly maintains a mixture of substantially uniform temperature notwithstanding fluctuations in the pressure of the fluids being controlled or variations in the volume of the mixture being delivered.

Another object of this invention is to provide an improved fluid mixing device which is simple in construction, inexpensive to manufacture and readily adjustable to predetermine the temperature of the mixture to be maintained.

Other objects of this invention will appear as the description of the invention proceeds.

The invention is capable of receiving a variety of mechanical expressions only one of which has been shown on the accompanying drawing, and therefore it is to be expressly understood that the drawing is for purposes of illustration only, and is not to be construed as a definition of the limits of the invention, reference being had to the appended claims for that purpose.

The accompanying drawing illustrates an embodiment of the present invention in elevation with parts broken away to show interior constructions.

As shown, the fluid mixer includes a housing 10 enclosing a mixing chamber 11 having a pair of inlets 12 and 13 and an outlet 14 for the mixture, said housing being of any suitable size, construction and material. Secured to the housing 10 in any suitable way, as by the bolted flanges shown at 15, are valve housings providing conduits leading to the mixing chamber for the fluids to be mixed, herein exemplified by a cold water valve housing and a hot water valve housing. As both of the cold and hot water valves with their respective housings and operating devices are preferably of identical construction, it will be sufficient to describe only one of them in detail.

The housing for the cold water valve, designated 16, may be of any suitable size, construction and material, and is provided interiorly with a partition 17 having a valve seat 18 surrounding the cold water port 19, said housing being connected in any suitable way, as by the flange 20, to any appropriate source of cold water. Housing 16 has an exteriorly threaded cylindrical wall 21 on which is threadedly mounted the cover 22. Mounted in the chamber provided by said wall 21 is an expansible and collapsible pressure responsive chamber of any suitable construction having a flexible wall which forms, carries or has operatively connected thereto a valve member of any suitable construction. In the form shown there is clamped between the end of the cylindrical wall 21 and the cover 22, so as to make a fluid tight joint, an interiorly projecting annular plate or ring 23 to which is hermetically sealed one end of a corrugated expansible and collapsible tubular wall or bellows 25. Hermetically sealed to the opposite end of said bellows 25 is a carrier 26 for a valve disk 27 of any suitable character, shown as retained on the carrier 26 by a screw 28. Carrier 26 and disk 27 constitute the valve member of the cold water valve, and said member is provided with a bleed opening 29 leading to the chamber 24 from the chamber in the valve housing at the upstream side of the valve seat 18. Valve member 26, 27 is normally biased toward its seat, either by the inherent resilience of the bellows 25 or by a coil spring 30 interposed between the carrier 26 and the cover 22. Leading from the interior of said chamber 24 to a pilot valve chamber to be described is a passage formed in any suitable way. As shown, a passage 31 in communication with said chamber 24 extends through an exteriorly threaded nipple 32 on said cover 22, and secured to said nipple in any suitable way, as by a union nut 33, is a conduit or pipe 34 suitably secured, as by union nut 35, to an exteriorly threaded nipple 36 on the pilot valve housing to be described.

The housing 37 for the hot water valve, connected to any suitable source of hot water, is shown broken away sufficiently to illustrate the interior partition 38 which provides a valve seat 39 surrounding the hot water port 40. The housing includes an exteriorly threaded cylindrical wall 41 on which is secured a cover member 42, and within the chamber thus provided is a pressure responsive chamber, in all respects like chamber 24, supporting a valve member composed of a carrier 43 on which a valve disk 44 is secured, as by a screw 45. The hot water valve member is provided with a bleed opening 47, comparable to the bleed opening 29, leading from the chamber in the valve housing at the upstream side of the valve seat 39 to the interior of the pressure responsive chamber, and said pressure responsive chamber is in communication with a passage including a pipe or conduit 48 secured to an exteriorly threaded nipple on the cover 42, as by a union nut 49, and secured, as by a union nut 50, on an exteriorly threaded nipple 51 on the cover of the pilot valve housing to be described.

The housing 10 for the mixing chamber 11 is exteriorly threaded at 52 where it is threadedly attached to the end 53 of a pilot valve housing 54 of any suitable size, construction and material so that the interior of said pilot valve housing is in open communication with the mixing chamber 11. Interiorly of said housing 54 is a partition 55 having an aperture 56 and a pilot valve port 57, the chamber defined within said partition 55 being in communication with the conduit 34 through a passage 58. The opposite end 59 of the pilot valve housing 54 is exteriorly threaded, and threadedly mounted thereon is a cover member 60 enclosing a chamber 61 which is in communication with conduit 48 through a passage 62. Interiorly of said cover member 60 is a partition 63 provided with a second pilot valve port 64 which is aligned with and preferably of the same size as the port 57.

Engaged with the partition 55 in surrounding relationship to the aperture 56, and here shown as sealed against leakage by an interposed gasket 65, is the tubular wall 66 of an elongated thermostat in the form of a bulb extending, as shown, for the full length of the mixing chamber 11 and formed of any suitable heat conductive material. One end of tubular wall 66 is closed by a flexible wall of any suitable construction, wall 66 being shown as inwardly flanged at 67 and having hermetically sealed thereto an expansible and collapsible corrugated tubular wall or bellows 68 that at its opposite end is hermetically sealed to a movable end wall 69. Suitably attached to said end wall 69, as by threading, is the stem 70 of a pilot valve member 71, here shown as provided with a pair of like conical valve surfaces 72 and 73 for cooperation with the ports 57 and 64, although as will be apparent from the ensuing explanation a single seating pilot valve may be used under some circumstances. A coil spring 74 is mounted in the chamber 61 between pilot valve member 71 and the end wall of the cover member 60 for a purpose to appear.

The opposite end of the tubular wall 66 from that associated with partition 55 is shown as having an enlargement 75 which is flanged at 76 and secured in position in an aperture 77 in the wall of the housing 10 by a cover 78 secured to said housing in any suitable way. Interiorly said enlargement 75 has a flexible wall of any suitable construction for completing the thermostatic chamber interiorly of wall 66. As shown, there is suitably secured to wall 75, as by brazing, an annular flanged member 79 to which is hermetically sealed an expansible and collapsible corrugated tubular wall or bellows 80 having a movable end wall 81. Engaged with or secured to said end wall 81 is a flanged cup-shaped member 82 having an aperture 83 in its end wall. Slidably mounted in said aperture 83 is a plunger 84 having a head 85 of such a size as to be slidingly received and guided in the chamber provided by said cup-shaped wall. The opposite end of plunger 84 is attached in any suitable way, as by threading, to a plate 86 between which and the flanged end of cup-shaped wall 82 is interposed a coil spring 87. Plate 86 is mounted or bears on the end of an adjusting screw 88 which extends outside of the cover 78 where it may be provided with any suitable means for threading the same inwardly or outwardly for adjusting the temperature to be maintained as hereinafter explained.

In order to increase the sensitivity of response of the thermostat whose exterior wall is defined by the tubular wall 66 a conduit 89 is preferably coiled around the same for the greater part of its length as illustrated, and may be slightly spaced therefrom if preferred, this conduit being in communication with the chamber 90 interiorly of said tubular wall 66 adjacent its opposite ends. Said chamber 90 which at its opposite ends is closed by the bellows 68 and 80 is an expansible and collapsible thermostatic chamber which is charged with any suitable thermosensitive medium, preferably a liquid which fills said chamber and conduit 89 through which the liquid may circulate, said liquid having an appropriate coefficient of expansion to operate the pilot valve as next to be explained.

When the mixer is not in operation cold and hot water bleeds through the openings 29 and 47 respectively in the valve members 26, 25; and 43, 44 to the pressure responsive chambers, like 24, thereby equalizing the pressure interiorly and exteriorly of said chambers, so that under the bias of the associated springs, as 30, the valve members are held against their valve seats to prevent fluid flow. As soon as the outflow conduit 14 is opened, however, the pressure in the mixing chamber 11 drops, and as the interiors of said pressure responsive chambers are in communication with said mixing chamber 11 through the passages including conduits 34 and 48 and the pilot valve ports 57 and 64, or at least one of them, the pressure inside of one or both of said pressure responsive chambers decreases so that there is an excess or differential pressure acting exteriorly on one or both of the valve members 26, 27 and 43, 44 to lift said valve members from their seats. If the thermostat is cold so that the pilot valve has closed port 57 the hot water entering the mixing chamber will quickly cause the thermostat to expand and open the port 57, so that thereafter both valve members are actuated by and under the control of the decrease in pressure in the mixing chamber communicated to the pressure responsive chambers.

The hot and cold water entering the chamber 11 form a mixture therein that is in contact with the thermostat defined by the tubular wall 66 and bellows 68 and 80 and including the tube 89 throughout the length of the mixing chamber, and, particularly when the tube 89 is used, the charge in said thermostat is therefore in intimate heat interchanging relationship with said mixture so that it responds promptly and accurately to the temperature thereof.

Assume that the temperature of the mixture rises above that to be maintained. The charge in the thermostat immediately responds to the temperature of the mixture and expands, collapsing the bellows 68 and moving the pilot valve member 71 through the stem 70 so as to decrease the opening through port 64 and increase the opening through port 57. As will be apparent this effects an increase in the back pressure acting in the pressure responsive chamber associated with the hot water valve and a decrease in the back pressure in the pressure responsive chamber associated with the cold water valve. This decrease in the back pressure acting on the cold water valve member means an increase in the differential pressure acting on the cold water valve member, while the increase in back pressure acting on the hot water valve member means a decrease in the differential pressure acting thereon. Consequently, the cold water valve is opened somewhat wider by the increased differential pressure while the hot water valve is somewhat closed as a result of the decreased differential pressure, the changes in the proportionate flow of the hot and cold water being accurately determined by the extent of movement of the pilot valve member 71 under the control of the expansion of the charge in the thermostat. This movement of the pilot valve member need not be more than a few thousandths of an inch so sensitive and accurately responsive is a device of the character described. Conversely, if the temperature becomes lower than that to be maintained, contraction of the charge in the thermostat means that the pilot valve member 71 moves to decrease the flow through port 57 and increase the flow through port 64, decreasing the differential pressure acting on the cold water valve member and increasing the differential pressure acting on the hot water valve member, so as to increase proportionately the hot water flow and decrease the cold water flow.

The temperature to be maintained in the mixture can be nicely predetermined by actuation of the screw 88, either inwardly or outwardly, to expand or contract the bellows 80 and thereby contract or expand the bellows 68 to move the pilot valve member 71 in one direction or the other and predetermine the relative areas of the pilot valve port openings and therefore how much expansion or contraction of the thermostat is required to so proportion said port areas that a mixture of the desired temperature is attained. Thus inward movement of the screw 88 transmits pressure through plate 86, spring 87 and cup-shaped wall 82 to the movable end wall 81 of the bellows 80, correspondingly contracting the bellows 68 against the tension of spring 74, while on outward movement of the screw 88 movable end wall 81 causes cup-shaped wall 82, spring 87 and plate 86 to follow said screw 88 as spring 74 expands to expand the bellows 68. If at any time the temperature of the mixture should cause the charge in the thermostat to expand after the pilot valve member has engaged its seat so that further contraction of the bellows 68 will be prevented, the additional expansion of the charge will not cause the thermostat to burst because it can contract the bellows 80 against the tension of its spring 87, plunger head 85 sliding in the cavity provided in the cup-shaped wall 82.

Inasmuch as the extent to which the hot and cold water valves are open at any time depends upon the extent to which the back pressures on the valve members are decreased, and this in turn depends upon the extent to which the pressure in the mixing chamber 11 is decreased, it will be observed that if the outlet from the chamber 11 is open wide, as when the mixer is to operate at full capacity, there is a maximum drop in pressure in the mixing chamber 11, so that maximum differential pressures tend to exist on both of the two valve members so as to open them to their maximum extent, although the amounts to which they are actually opened is proportionated by the position of the pilot valve member under the control of the thermostat so as to obtain the desired temperature in the mixture. On the other hand, with smaller amounts of outflow from the chamber 11 the decrease in the pressure in the chamber 11 is correspondingly less, and the differential pressures acting on the hot and cold water valve members and tending to open them are correspondingly less, so that these valve members are open to lesser extents but in properly proportionated amounts under the control of the pilot valve member. The foregoing continues to be true even though the outflow is cut down to a minimum.

It will therefore be observed that by reason of the present invention a mixing device has been provided wherein the proportioning of the fluids to be mixed is smoothly and accurately controlled without tendency of the valve members to hunt or to be adversely affected by variations in the pressure of the fluids being mixed. The thermostatic control is sensitively and accurately responsive to any change in the temperature of the mixture, and only a very slight resulting change in the position of the pilot valve results in a modification of the differential pressures acting on the respective valve members so as to reproportion the flow of the component fluids to establish and maintain the desired temperature. As the valve members are operated solely by differential pressures derived from the pressures of the fluids under control, the operation continues the same even though there may be wide fluctuations in the pressures of these fluids. The extent to which both valve members are open depends on the differential pressures acting on said valve members and as these differentials in turn vary with the variations in pressure in the mixing chamber, dependent on the outflow of liquid therefrom, the control continues to function in exactly the same way whether small or large quantities of mixture are being withdrawn from the mixing chamber.

The thermostat may be readily adjusted by manipulation of the screw 68, and if desired the cover 78 may be calibrated to facilitate pre-setting of the thermostat to obtain the temperature desired. By reason of the construction of the thermostat it is highly sensitive to variations in the temperature of the mixture. At the same time the mixing device is composed of a relatively few simple elements that are easy to fabricate and assemble so that it may be produced at relatively low cost. Therefore, the present invention provides a fluid mixer which overcomes the objections hereinbefore pointed out and which assures a mixture of uniformly maintained temperature whether the rate of usage of the mixture be large or small.

While the embodiment of the invention illustrated on the drawing has been described with considerable particularity, it is to be expressly understood that the invention is not limited thereto as the same is capable of receiving a variety of expressions, as will now be apparent to those skilled in the art, while changes may be made in the details of construction, arrangement, proportion, size, etc., parts may be replaced by equivalent parts, etc., without departing from the spirit of the invention. Also, within the broader aspects of the present invention other forms of thermostat may be used, other forms of pressure responsive chambers may be employed, other forms of pilot valve, flow control valves, adjusting mechanism, etc., may be utilized. Reference is therefore to be had to the appended claims for a definition of the invention.

What is claimed is:

1. In a fluid mixing device including an elongated tubular housing providing a mixing chamber having a pair of inlets adjacent one end thereof and an outlet adjacent the opposite end thereof, conduits for the fluids to be mixed respectively communicating with said mixing chamber through said inlets, a valve housing in each of said conduits provided with a valve port, means providing an expansible and collapsible chamber having a movable wall in each of said valve housings, each of said movable walls having a bleed opening therethrough providing communication between the chamber in said valve housing on the upstream side of the associated valve port and the interior of the expansible and collapsible chamber, a valve member operatively connected to each movable wall for movement to closed position when the fluid pressure acting on opposite sides of said wall is equalized, a pilot valve housing mounted on the end of said tubular housing adjacent said inlets, conduits connecting each of said expansible and collapsible chambers with said pilot valve housing, a pair of aligned ports in said pilot valve housing through which the respective conduits communicate with said mixing chamber, a pilot valve in said pilot valve housing for controlling said ports and thereby the escape of fluid from said expansible and collapsible chambers to said mixing chamber to predetermine the pressures existing in the respective expansible and collapsible chambers and thereby the position of said valve members due to the differential pressures acting on said movable walls, and an elongated tubular thermostat extending throughout substantially the entire length of said mixing chamber and operatively connected to said pilot valve.

2. In a fluid mixing device including an elongated tubular housing providing a mixing chamber having a pair of inlets adjacent one end thereof and an outlet adjacent the opposite end thereof, conduits for the fluids to be mixed respectively communicating with said mixing chamber through said inlets, a valve housing in each of said conduits provided with a valve port, means providing an expansible and collapsible chamber having a movable wall in each of said valve housings, each of said movable walls having a bleed opening therethrough providing communication between the chamber in said valve housing on the upstream side of the associated valve port and the interior of the expansible and collapsible chamber, a valve member operatively connected to each movable wall for movement to closed position when the fluid pressure acting on the opposite sides of said wall is equalized, a pilot valve housing mounted on the end of said tubular housing adjacent said inlets, conduits connecting each of said expansible and collapsible chambers with said pilot valve housing, a pair of aligned ports in said pilot valve housing through which the respective conduits communicate with said mixing chamber, a pilot valve in said pilot valve housing for controlling said ports and thereby the escape of fluid from said expansible and collapsible chambers to said mixing chamber to predetermine the pressures existing in the respective expansible and collapsible chambers and thereby the position of said valve members due to the differential pressures acting on said movable walls, and an elongated tubular thermostat extending throughout substantially the entire length of said mixing chamber and operatively connected to said pilot valve, said elongated tubular member providing a chamber charged with a thermosensitive fluid and having a tube wrapped around the same with its opposite ends in communication with said chamber.

3. In a fluid mixing device including an elongated tubular housing providing a mixing chamber having a pair of inlets adjacent one end thereof and an outlet adjacent the opposite end thereof, conduits for the fluids to be mixed respectively communicating with said mixing chamber through said inlets, a valve housing in each of said conduits provided with a valve port, means providing an expansible and collapsible chamber having a movable wall in each of said valve housings, each of said movable walls having a bleed opening therethrough providing communication between the chamber in said valve housing on the upstream side of the associated valve port and the interior of the expansible and collapsible chamber, a valve member operatively connected to each movable wall for movement to closed position when the fluid pressure acting on opposite sides of said wall is equalized, a pilot valve housing mounted on the end of said tubular housing adjacent said inlets, conduits connecting each of said expansible and collapsible chambers with said pilot valve housing, a pair of aligned ports in said pilot valve housing through which the respective conduits communicate with said mixing chamber, a pilot valve in said pilot valve housing for controlling said ports and thereby the escape of fluid from said expansible and collapsible chambers to said mixing chamber to predetermine the pressures existing in the respective expansible and collapsible chambers and thereby the positioning of said valve members by the differential pressures acting on said movable walls, and an elongated tubular thermostat extending throughout substantially the entire length of said mixing chamber and operatively connected to said pilot valve, said elongated tubular member providing a chamber charged with a thermosensitive fluid and having at the end adjacent said pilot valve a corrugated expansible and collapsible member provided with a movable wall operatively connected to said pilot valve and at its opposite end an expansible and collapsible corrugated member provided with a movable wall, and adjustable means associated with said last named movable wall for applying pressure to the thermosensitive fluid in said chamber.

CHARLES D. BRANSON.

REFERENCES CITED

The following references are of record in the file of this patent:

UNITED STATES PATENTS

| Number | Name | Date |
|---|---|---|
| 1,176,535 | Fulton | Mar. 21, 1916 |
| 1,842,358 | Cartier | Jan. 19, 1932 |
| 1,869,663 | Cartier | Aug. 2, 1932 |
| 2,205,334 | Barnes | June 18, 1940 |
| 2,335,761 | Hultman | Nov. 30, 1943 |
| 2,449,766 | Brown | Sept. 21, 1948 |

FOREIGN PATENTS

| Number | Country | Date |
|---|---|---|
| 671,115 | Germany | Feb. 1, 1939 |
| 824,881 | France | Nov. 18, 1937 |
| 882,839 | France | Mar. 8, 1943 |